US012782530B2

(12) United States Patent
Menezo

(10) Patent No.: US 12,782,530 B2
(45) Date of Patent: Nov. 3, 2026

(54) PHOTONIC CHIP AND PHOTONIC COMPONENT INTEGRATING SUCH A CHIP

(71) Applicant: Scintil Photonics, Grenoble Cedex (FR)

(72) Inventor: Sylvie Menezo, Grenoble Cedex (FR)

(73) Assignee: Scintil Photonics, Grenoble (FR)

( * ) Notice: Subject to any disclaimer, the term of this patent is extended or adjusted under 35 U.S.C. 154(b) by 680 days.

(21) Appl. No.: 18/252,781

(22) PCT Filed: Nov. 10, 2021

(86) PCT No.: PCT/FR2021/051991
§ 371 (c)(1),
(2) Date: May 12, 2023

(87) PCT Pub. No.: WO2022/112679
PCT Pub. Date: Jun. 2, 2022

(65) Prior Publication Data

US 2024/0004046 A1 Jan. 4, 2024

(30) Foreign Application Priority Data

Nov. 24, 2020 (FR) ...................................... 2012049

(51) Int. Cl.
*G01S 7/499* (2006.01)
*G01S 7/481* (2006.01)
(Continued)

(52) U.S. Cl.
CPC ............. *G01S 7/499* (2013.01); *G01S 7/4811* (2013.01); *G01S 7/4815* (2013.01);
(Continued)

(58) Field of Classification Search
CPC .......... G01S 7/48; G01S 7/481; G01S 7/4811; G01S 7/4818; G01S 7/499; G01S 17/02; G01S 17/34; G02B 6/2746
See application file for complete search history.

(56) References Cited

U.S. PATENT DOCUMENTS

2006/0182383 A1 8/2006 Slotwinski
2013/0292555 A1 11/2013 Akkaya et al.
(Continued)

FOREIGN PATENT DOCUMENTS

DE 102019114579 A1 1/2020
SE 507936 C2 * 7/1998
(Continued)

OTHER PUBLICATIONS

Gao et al., Frequency-Modulated Continuous-Wave Lidar Using I/Q Modulator for Simplified Heterodyne Detection, Optics Letters, vol. 37, No. 11, (Jun. 1, 2012), pp. 2022-2024.
(Continued)

*Primary Examiner* — Michael Stahl
(74) *Attorney, Agent, or Firm* — TraskBritt

(57) ABSTRACT

A photonic chip includes at least one photonic circuit comprising at least one laser source for providing a first radiation, referred to as local oscillator, to an optical mixer and for providing an emission radiation to a coupling device, the local oscillator and the emission radiation having a predetermined polarization. The coupling device is configured to propagate in free space, from a measuring surface, the emission radiation in the form of an emission light beam, to receive, in return, on the measuring surface a reflected light beam and to guide it toward the optical mixer as reflected radiation having the predetermined polarization. The optical mixer generates a measurement signal by interferometric pulse of the local oscillator and the reflected radiation. The present disclosure also relates to an optical component comprising such a photonic chip.

20 Claims, 9 Drawing Sheets

(51) Int. Cl.
*G01S 17/34* (2020.01)
*G02B 6/27* (2006.01)

(52) U.S. Cl.
CPC ............ *G01S 7/4816* (2013.01); *G01S 17/34* (2020.01); *G02B 6/2746* (2013.01); *G01S 7/4818* (2013.01)

(56) References Cited

U.S. PATENT DOCUMENTS

| | | | | |
|---|---|---|---|---|
| 2015/0055115 | A1* | 2/2015 | Pedersen | G01S 17/58 356/4.01 |
| 2019/0018120 | A1* | 1/2019 | Efimov | G01S 7/4815 |
| 2019/0324214 | A1 | 10/2019 | Hosseini et al. | |
| 2020/0031931 | A1 | 1/2020 | Qui et al. | |
| 2020/0142066 | A1 | 5/2020 | Sandborn et al. | |
| 2020/0319314 | A1 | 10/2020 | Behzadi et al. | |
| 2020/0333533 | A1* | 10/2020 | Rogers | G01S 17/89 |
| 2022/0011409 | A1* | 1/2022 | Hosseini | G01S 7/4818 |

FOREIGN PATENT DOCUMENTS

| | | | |
|---|---|---|---|
| WO | 2019/161388 | A1 | 8/2019 |
| WO | 2020/205450 | A1 | 10/2020 |

OTHER PUBLICATIONS

Inoue et al., Demonstration of a New Optical Scanner Using Silicon Photonics Integrated Circuit, Optics Express, vol. 27, No. 3, (Feb. 4, 2019), 10 pages.

International Search Report for Application No. PCT/FR2021/051991 dated Mar. 3, 2022, 4 pages.

International Written Opinion for Application No. PCT/FR2021/051991 dated Mar. 3, 2022, 16 pages.

Martin et al., Photonic Integrated Circuit-Based FMCW Coherent LiDAR, Journal of Lightwave Technology, vol. 36, No. 19, (Oct. 1, 2018), pp. 4640-4645.

Poulton et al., Coherent Solid-State LIDAR with Silicon Photonic Optical Phased Arrays, Optics Letters, vol. 42, No. 20, (Oct. 15, 2017), pp. 4091-4095.

Seok et al., Large-Scale Broadband Digital Silicon Photonic Switches with Vertical Adiabatic Couplers, Optica, vol. 3, No. 1, (Jan. 2016), pp. 64-70.

Zhang et al., A 20×20 Focal Plane Switch Array for Optical Beam Steering, in Conference on Lasers and Electro-Optics, OSA Technical Digest (Optica Publishing Group, 2020), paper SM10.3.

* cited by examiner

PHOTONIC CHIP AND PHOTONIC COMPONENT INTEGRATING SUCH A CHIP

CROSS-REFERENCE TO RELATED APPLICATIONS

This application is a national phase entry under 35 U.S.C. § 371 of International Patent Application PCT/FR2021/051991, filed Nov. 10, 2021, designating the United States of America and published as International Patent Publication WO 2022/112679 A1 on Jun. 2, 2022, which claims the benefit under Article 8 of the Patent Cooperation Treaty to French Patent Application Serial No. FR2012049, filed Nov. 24, 2020.

TECHNICAL FIELD

The present disclosure relates to a photonic chip and a photonic component integrating such a chip. They are very particularly applicable in the field of free-space communication and LiDAR (Light Detection and Ranging) or fiber optic telemetry.

BACKGROUND

The document "20×20 Focal Plane Switch Array for Optical Beam Steering" by X. Zhang et al, 2020 *Conference on Lasers and Electro-Optics* (*CLEO*), San Jose, CA, USA, 2020, proposes a two-dimensional device for steering an optical beam made up of a 20×20 array of switches integrated on a photonic chip made of silicon with microelectromechanical (MEMS) optical switches. These switches are respectively connected to surface couplers, and light radiation can selectively propagate from a light source to a selected coupler, by selecting this coupler according to its row rank and its column rank. A collimating lens is associated with the integrated device so that the surface couplers are arranged in the focal plane of the lens. Each surface coupler is configured to propagate light radiation in free space in the form of an emission light beam that, in far field, is oriented along a straight line extending from the surface coupler and passing through the center of the lens. Thus, an integrated beam-steering device allowing faster steering, with lower consumption and with a wide field of view compared with conventional mechanical solutions, is available. This device may form a component of a LiDAR system, for example.

As for the document by Ch. Poulton et al. "Coherent solid-state LiDAR with Silicon photonic optical phased arrays," Opt. Lett. 42, 4091-4094 (2017), it proposes a frequency-modulated continuous wave (FMCW) LiDAR using integrated optical phased arrays for steering an emission light beam. This component comprises a photonic integrated circuit formed on a silicon platform and having a first edge coupler for propagating the light beam in free space through the optical phased array. It comprises a second edge coupler for receiving the reflected beam on a body of a scene illuminated by the emission beam.

A photonic component implementing a frequency-modulated continuous wave LiDAR generally exploits an optical mixer to generate a measurement signal by interferometric pulse between an emission radiation and a reflected radiation. The force of the measurement signal depends on the polarization of these signals. To maximize this force, it is necessary for the radiations to have the same polarization at the input of the mixer, the measurement signal being zero if the polarizations of the two radiations are orthogonal to each other.

Patent application WO2019161388A1 and the publication "Photonic Integrated Circuit-Based FMCW Coherent LiDAR," JOURNAL OF LIGHTWAVE TECHNOLOGY, VOL. 36, NO. 19, Oct. 1, 2018 propose other frequency-modulated continuous wave LiDAR architectures. As in the previous reference, these architectures also provide two couplers, respectively for transmitting and receiving, which reduces the compactness of the photonic circuit.

Furthermore, these architectures implement at least one fiber circulator to differentiate the forward path traveled by a transmission radiation and a return path traveled by a reflected radiation. In order to maintain the polarization of the optical fields of these radiations, the fibers must maintain their polarization, which is expensive. Finally, these architectures are not robust to changes in polarization of the reflected radiation, these changes being able to be linked to the nature of the illuminated body of the scene, or to the angle of incidence of the light beam on this body.

BRIEF SUMMARY

The present disclosure proposes a photonic chip and a photonic component for transmitting and receiving a light beam that differs from this state of the art, and seeks to provide a highly integrated solution. In some embodiments, the chip and the photonic component, while preserving their compact characters, are able to illuminate the scene using beams having two different polarizations.

In order to achieve this aim, the object of the present disclosure proposes a photonic chip including at least one emission-reception circuit comprising at least one laser source for providing a first radiation, referred to as local oscillator, to an optical mixer and for providing an emission radiation to a coupling device, the local oscillator and the emission radiation having a predetermined polarization. The coupling device is configured to propagate in free space, from a measuring surface, the emission radiation in the form of an emission light beam, to receive, in return, on the measuring surface a reflected light beam and to guide it toward the optical mixer as reflected radiation having the predetermined polarization. The optical mixer generates a measurement signal by interferometric pulse of the local oscillator and the reflected radiation.

According to other advantageous non-limiting features of the present disclosure, taken alone or according to any technically feasible combination:

- the laser source comprises, or is associated with, a frequency modulator;
- the photonic chip comprises a power splitter optically associated with the laser source, the power splitter providing the local oscillator and the emission radiation;
- the coupling device of the transceiver circuit comprises a first waveguide and a second waveguide and, arranged between the first and the second waveguide, an edge coupler optically connected to a polarization beam splitter and to a polarization rotator;
- the coupling device of the transceiver circuit comprises a first waveguide and a second waveguide and, arranged between the first and the second waveguide, a surface coupler with a polarization-splitting grating;
- the transceiver circuit comprises a first measurement channel for propagating a first emission beam having, at the chip output, a first propagation polarization and a second measurement channel for propagating a second emission beam having a second propagation polarization, orthogonal to the first;

the first emission beam is propagated by a first coupling device and the second emission beam is propagated by a second coupling device, discrete from the first;

the transceiver circuit comprises a first switch optically arranged between the laser source and the first and second coupling device and a second switch optically arranged between the first and second coupling device and the mixer;

the transceiver circuit comprises:

a first switch for selectively connecting a first waveguide of a multiplexing coupling device to the laser source or to the mixer;

a second switch for selectively connecting a second waveguide of the multiplexing coupling device to the laser source or to the mixer;

the photonic chip comprises a plurality of transceiver circuits;

the transceiver circuit comprises a plurality of coupling devices;

the at least one laser source emits radiation having a plurality of wavelengths and the transceiver circuit comprises a wavelength-division demultiplexer for respectively distributing the wavelengths of the radiation toward the coupling devices optically connected to outputs of the demultiplexer;

the transceiver circuit comprises a plurality of laser sources respectively emitting the plurality of wavelengths, the transceiver circuit also comprising a wavelength-division multiplexer for producing the radiation having the plurality of wavelengths;

the outputs of the demultiplexer are respectively coupled to power splitters providing, respectively, local oscillators to mixers and emission radiations to the coupling devices (C);

the transceiver circuit comprises:

a unidirectional transmission bus optically connected to the laser source and a reception bus optically connected to the mixer, the plurality of coupling devices being arranged optically between the unidirectional transmission bus and the reception bus;

a first plurality of transmission elements, arranged between the unidirectional transmission bus and the plurality of coupling devices, in order to selectively couple the unidirectional transmission bus to a predetermined coupling device and to allow the propagation of the emission radiation;

a second plurality of transmission elements, arranged between the plurality of coupling devices and the reception bus, for selectively coupling the predetermined coupling device to the reception bus and allowing the propagation of the reflected radiation;

the transmission elements are filters, the filters respectively associated with a coupling device having ranges of transmission wavelengths that are identical to one another;

the transmission elements are switches;

the transceiver circuit comprises a bidirectional transmission bus optically arranged between a power splitter and the mixer, the bidirectional transmission bus being selectively coupled to the coupling devices by optical circulator switches;

the photonic chip also comprises two switches for selectively propagating the emission radiation in the bidirectional transmission bus in a first propagation direction or in a second propagation direction, opposite to the first.

According to another aspect, the present disclosure proposes a photonic component comprising at least one photonic chip as described previously and at least one Faraday rotator arranged at the measuring surface of the chip in order to intercept the emission beam and the reflected beam.

The photonic component may comprise a lens for collimating the emission beam and the reflected beam and/or a polarizer configured to allow the transmission of the emission beam and the reflected beam according to a single polarization.

BRIEF DESCRIPTION OF THE DRAWINGS

Other features and advantages of the present disclosure will emerge from the following detailed description of the present disclosure with reference to the appended figures, in which.

DETAILED DESCRIPTION

Figure 1A:
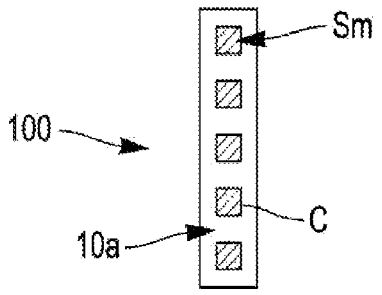
FIGS. 1A and 1B depict two views of a first embodiment of a photonic device according to the present disclosure.

In the present disclosure, "photonic chip" denotes an integrated circuit based on semiconductor materials formed by the standard microelectronic techniques. This chip can be formed from an assembly of independent elements based on semiconductor materials, for example, laser sources, photo detectors, waveguides, electrical or electronic processing circuits.

General Description of the Photonic Component

With reference to FIGS. 1A, 1B, 2A and 2B, two embodiments of a photonic component 100 according to the present disclosure are presented.

Such a component 100 comprises a photonic chip 10 having a main surface 10*a*. Measuring surfaces Sm of a plurality of optical coupling devices C are flush with the main surface 10*a*. As will become apparent in the rest of this description, each coupling device C makes it possible to propagate, at its measuring surface Sm, in free space, an electromagnetic emission radiation, generated by the chip 10 in the form of an emission light beam. This emission beam is reflected by an illuminated body of a scene arranged in the field of view of the component 100. The same measuring surface Sm of the photonic chip 10 makes it possible to receive, in return, the light beam reflected by the body. The coupling device C associated with this measuring surface Sm injects and guides this beam in the form of electromagnetic radiation reflected in the photonic chip 10. "The same measuring surface" means that the emission light beam and the reception light beam are at least partially superimposed on the main surface 10*a*. A single coupling device C ensures the emission of the light beam and the reception of the reflected beam at this surface. It is not necessary to provide complex fiberizing of the component 100, as is the case with certain architectures of the prior art presented in the introduction to this disclosure.

Each coupling device C is part of a transceiver circuit 1 of the chip 10, a detailed description of which is provided in subsequent sections of this disclosure. The photonic chip 10 provided with at least one transceiver circuit 1 is able to generate the emission light beam and to process the reflected light beam to generate an electrical measurement signal V representative of the distance separating the photonic component 100 from the reflection body and/or the relative speed of the component 100 and of this body.

Aside from the photonic chip 10, the photonic component 100 also comprises, arranged on the main surface 10*a* of the photonic chip 10, at least one collimating lens. The measuring surfaces Sm of the coupling devices C are arranged in the focal plane of the lens L. These coupling devices C are designed so that, according to their position on the main surface 10*a*, the emission light beams that emerge from the measuring surfaces Sm project in far fields along straight lines (depicted in dotted lines in FIGS. 1B and 2B) passing through the optical center of the lens L. It is possible to provide a single lens L as depicted in FIGS. 1B and 2B, but a plurality of lenses can alternatively be provided, for example, a lens associated with each measuring surface Sm.

In the optical path of the emission and reflected light beams, an optional optical part 20 is also arranged, herein arranged on the main surface 10*a* of the chip 10 and sandwiched between the photonic chip 10 and the lens L. Other arrangements of this optical part 20 are possible insofar as the latter remains in the optical path of the emission and reflected light beams. It may especially be integrated into the chip 10. To make it possible to discriminate the emission radiation from the reflected radiation in the transceiver circuits 1 of the chip 10, the optical part 20 comprises a 45° polarization rotator, for example, a Faraday rotator, so that after propagation of the emission beam and the return of the reflected beam, the reflected radiation propagating from the main surface 10*a* of the photonic chip 10 has a polarization orthogonal to the emission radiation. The polarization rotator is not necessary when the reflected beam naturally has a polarization orthogonal to the emission beam, for example, when such a polarization rotation is carried out during the reflection of the emission beam on the illuminated body of the scene.

The optical part 20 may also comprise, in addition to the polarization rotator, a polarizer arranged downstream of the Faraday rotator in the direction of propagation of the emission beam. This polarizer is configured to allow transmission of the emission light beams and reflected light beams according to a single polarization (the beam propagation polarization, modified by the Faraday rotator when the latter is present). This especially prevents parasitic components of the reflected light beam, having different polarizations of the propagation polarization, from coupling to the photonic chip 10 and propagating in the transceiver circuits 1 of this chip 10, in particular, toward the laser sources contained in these circuits. The use of such a polarizer is preferable when the power of the reflected radiation is greater than 1/100 of the power of the emission radiation.

In operation, the photonic component 100 can be operated to generate an emission light beam from a measuring surface Sm associated with a selected transceiver circuit 1, so as to propagate a beam in a selected direction. By processing the reflected radiation received at the same measuring surface Sm, it is possible to generate an electrical signal V representative of the distance and/or the relative speed of a body arranged in the selected direction. For this purpose, the photonic chip 10 may comprise or be electrically associated with a control circuit making it possible to select or to operate one of the transceiver circuits 1 of the chip 10.

By successively scanning or, in some cases, by simultaneously activating the coupling devices C of the photonic chip 10 oriented in a plurality of directions, it is possible to collect and process relative distance/speed information of the entire scene, for example, to depict it in the form of a point cloud as is well known per se.

Figure 1B:
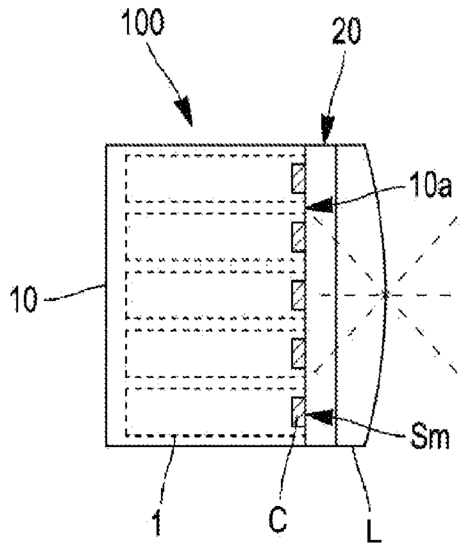

In the first embodiment of FIGS. 1A (front view) and 1B (side view), the photonic component 100 is generally bar-shaped, that is to say a rectangular parallelepiped having one relatively narrow face, and one relatively wide face. The narrow face of the bar corresponds to the main surface 10*a* of the photonic chip 10. The measuring surfaces Sm of the coupling devices C herein are aligned in a row on the narrow face of the bar. FIGS. 1A and 1B depict a photonic component 100 provided with five measuring surfaces Sm and therefore capable of generating a light beam in five different directions, but the photonic component 100 could more generally be provided with any number of measuring surfaces Sm, typically between 1 and 100 of these surfaces. By way of illustration, each measuring surface Sm may have a size of the order of several square microns, or even one hundred to several hundred square microns, and two of these surfaces Sm can be separated by a distance typically between 3 and 500 microns.

In the illustration of the first embodiment of FIGS. 1A and 1B, each measuring surface Sm of a coupling device is associated with a transceiver circuit 1. To manufacture such a circuit, the usual microelectronic processing steps are applied to a substrate whose main plane corresponds to the wide face of the bar, therefore perpendicular to the main surface 10*a* carrying the measuring surfaces Sm. The coupling devices C may each comprise an edge coupler EC, the end of which flush with the main surface 10*a* forms the measuring surface Sm. The term "edge coupler" denotes any device for coupling a beam to a waveguide wherein the guide is arranged in the beam propagation plane. This type of coupler is also designated by the expression "in-plane coupler" in the field. It may especially be an adiabatic coupler.

Figure 2A:
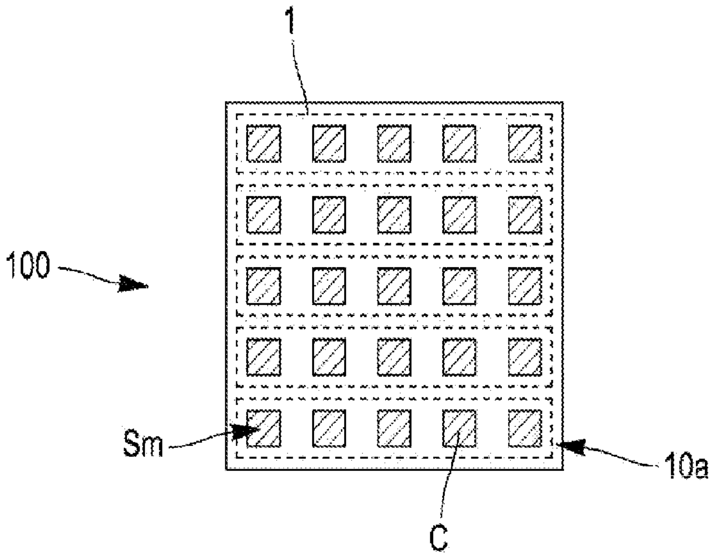
FIGS. 2A and 2B depict two views of a second embodiment of a photonic device according to the present disclosure.
Figure 2B:
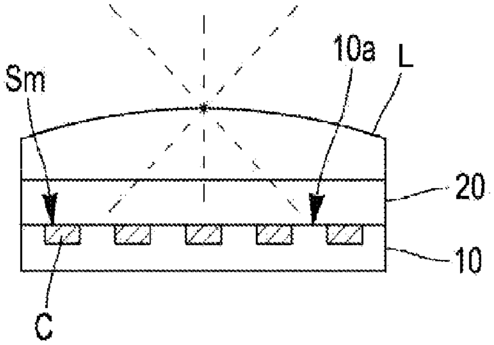

In the second embodiment of FIGS. 2A and 2B, the measuring surfaces Sm of the coupling devices C are arranged in a matrix on the relatively wide main surface 10*a* of the photonic chip 10. This main surface 10*a* corresponds to the main plane of the manufacturing substrate of this chip 10 and the coupling devices C in this case advantageously comprise at least one grating coupler GC. "Surface coupler" denotes any device for coupling a beam to a waveguide in which the guide is arranged outside the beam propagation plane, substantially perpendicular to this propagation plane. This type of coupler is also designated by the expression "off-plane coupler" or "vertical coupler" in the field. It may especially be a surface coupler with a polarization-splitting grating.

In this embodiment, a transceiver circuit 1 advantageously comprises a plurality of coupling devices C aligned in a column on the main surface 10*a* of the chip 10. This chip 10 may comprise a plurality of transceiver circuits 1 arranged side-by-side so as to form a matrix arrangement of the measuring surfaces Sm on the main surface 10*a*. The matrix may be of any size, for example, ranging from a 2×2 matrix to a 100×100 matrix, square or rectangular, and arranged in rows and columns as depicted in the figures, or according to any other arrangement, for example, in polar form.

By way of illustration, each measuring surface Sm may have a size of the order of several square microns, or even one hundred to several hundred square microns and two of these surfaces Sm may be separated by a distance typically between 3 and 500 microns.

General Description of the Transceiver Circuit

Figure 3:
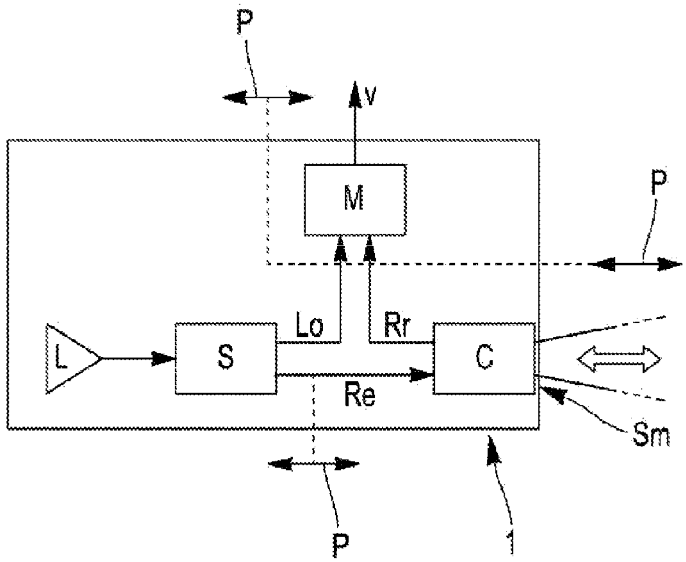
FIG. 3 illustrates the architecture and the operating principles of a transceiver circuit of a photonic chip according to the present disclosure.

Referring now to FIG. 3, general operating principles of a transceiver circuit 1 are presented that can be integrated into the photonic chips 10 that have just been presented.

This transceiver circuit 1 provides the emission of the light beam and the reception of the reflected light beam from the photonic component 100. It implements a Frequency Modulated Continuous Wave (FMCW) technique in order to generate the measurement signal V.

The transceiver circuit 1 comprises a laser source L, or is connected to a laser source, optically associated with a power splitter S for providing a first radiation, referred to as local oscillator LO, to a first input of an optical mixer M. The power splitter S also provides a second radiation, referred to as emission radiation Re, which is guided toward the coupling device C. It is noted that the splitter S does not form an essential element of the circuit 1, and that it is possible to provide other arrangements making it possible to provide the local oscillator LO and the emission radiation Re, for example, via two discrete and synchronized laser sources.

As already presented, this coupling device C is configured to project at a measuring surface Sm (for example, the exposed surface of an edge coupler or a surface coupler with a polarization-splitting grating) the emission radiation Re in free space in the form of an emission beam. The coupling device C is also configured to receive at the same measuring surface Sm the reflected light beam. The coupling device C injects the reflected beam into the photonic circuit 1 in the form of a reflected radiation Rr that it guides toward an optical mixer M.

The mixer M therefore receives the local oscillator LO and the reflected radiation Rr (which have a single predetermined polarization p, as is symbolized in FIG. 3) that it causes to pulse together in an interferometric manner on one or more photodetectors in order to generate the electrical measurement signal V. As is well known per se, and recalled in the document by Ch. Poulton presented in the introduction, the mean frequency of this measurement signal is representative of the distance separating the photonic component 100 integrating the circuit 1 from the body that reflects the emission light beam. The electrical measurement signal can also be processed in order to determine the relative speed of this body. To allow this operation, the laser source L comprises, or is associated with, a frequency modulator, for example, by modulating its ramp or triangle frequency. This modulation can be obtained by controlling the injection current of the source L or by using a light-phase modulator.

As already mentioned, the transceiver circuit 1 is associated with a control circuit, which may or may not be integrated into the chip 10, and which provides in all cases the electrical signals to the transceiver circuit(s) 1 (and especially to the laser source L) allowing its/their operation. The control circuit can also be connected to the transceiver circuit(s) 1 in order to receive the measurement signal or signals V and carry out the conversion processing operations making it possible to establish a distance and/or speed measurement.

The transceiver circuit 1 is, in all cases, produced according to usual photonic techniques, for example, from a silicon-on-insulator substrate. The radiation propagating in this circuit, such as the radiation emitted by the laser source L, the emission radiation Re, the reflected radiation Rr and the local oscillator LO are guided between the various elements of the circuit 1 via waveguides.

An important characteristic of the photonic chip 10 of the present disclosure is that of exploiting a single measuring surface Sm of a coupling device C to emit the emission beam and receive the reflected beam. This characteristic makes it possible to form a particularly compact chip 10 and photonic component 100, and to use the same optical part 20 and/or a single collimating lens/block of lenses L to process the emission beam and the reflected beam.

As already mentioned, this characteristic may require properly insulating, at the coupling device C, firstly the emission radiation Re intended to be guided toward the measuring surface Sm, and secondly the reflected radiation Rr that is guided toward the optical mixer M. This insulation can be implemented in several ways, depending on the level of insulation required for the system.

Figure 4:
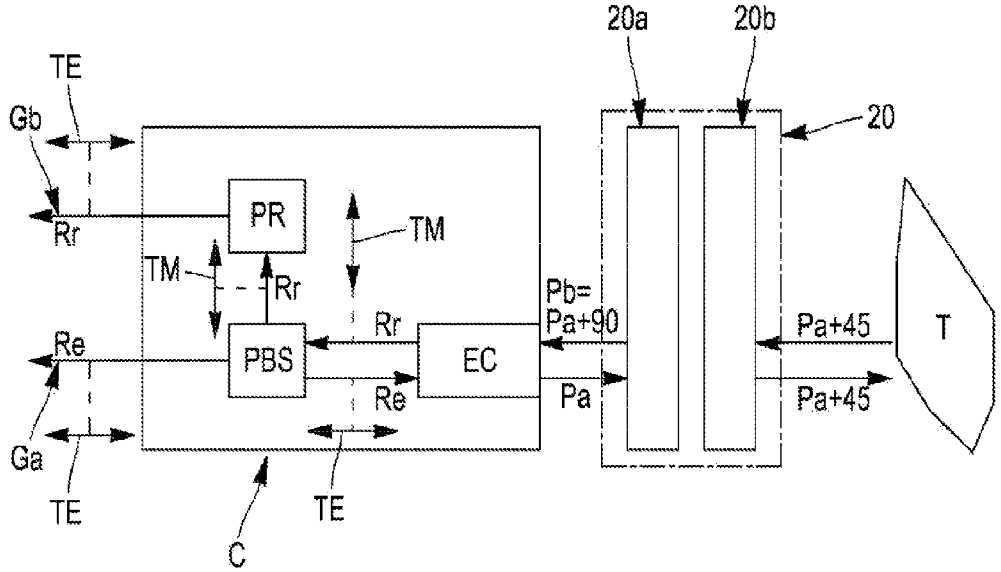
FIG. 4 depicts a first exemplary embodiment of a coupling device.

Thus, according to a first example depicted in FIG. 4, the coupling device C implements an edge coupler EC and comprises a polarization beam splitter PBS receiving the emission radiation Re from the splitter S or from a laser source L via a first waveguide Ga. The polarization beam splitter PBS is optically connected firstly to the coupler EC and secondly to a polarization rotator PR. As is well known, the polarization beam splitter PBS splits the radiation incident on it into two radiation beams with orthogonal polarizations. The polarization rotator is connected to a second waveguide Gb, in order to propagate the reflected radiation toward the mixer M.

In FIG. 4, the polarizations TE, TM of the radiation that propagates in the coupling device C are symbolized in this way. The emission radiation Re herein has a predetermined polarization TE matching one of the orthogonal splitting polarizations of the polarization beam splitter PBS. This radiation is therefore transmitted with little or no attenuation to the coupler EC.

At the output of the chip 10, the emission light beam that is emitted in free space at the emission surface Sm of the coupler EC has a propagation polarization Pa (related to the predetermined polarization TE, but not necessarily identical) and undergoes a first rotation through 45° of its polarization by passing first through the Faraday rotator 20*a* of the optical part 20 so as to have a modified propagation polarization Pa+45. The reflected light beam (which is hypothesized herein as having the same polarization Pa+45 as that of the emission beam after the latter has passed through the optical part 20) undergoes a second rotation through 45° of its polarization on the return path by passing through the Faraday rotator 20*a* of the optical part 20 again, to adopt a polarization Pb, which is thus orthogonal to the propagation polarization, before being projected onto the measuring surface. The reflected radiation Rr guided by the coupler EC has a polarization TM orthogonal to the polarization TE of the emission radiation Re. And this reflected radiation Rr is therefore directed toward a channel of the polarization beam splitter PBS discrete from the channel receiving the emission radiation Re. The reflected radiation Rr is then guided toward the polarization rotator PR making it possible, by imposing a 90° rotation, to return the reflected radiation Rr to the original predetermined polarization TE, that is to say that of the emission radiation Re. The reflected radiation Rr therefore has the same polarization as the local oscillator LO so that they can be processed significantly by the mixer M and establish the measurement V.

It should be noted that the coupling device C of FIG. 4 could be used in an inverted configuration according to which the emission radiation Re is propagated via the second waveguide Gb on the second input of the coupling device C, and the reflected radiation propagated via the first waveguide Ga on the first input of the coupling device C. In this inverted configuration, the emission beam has, at the chip output, a propagation polarization Pb orthogonal to that of the "standard" configuration presented in FIG. 4.

Figure 5:
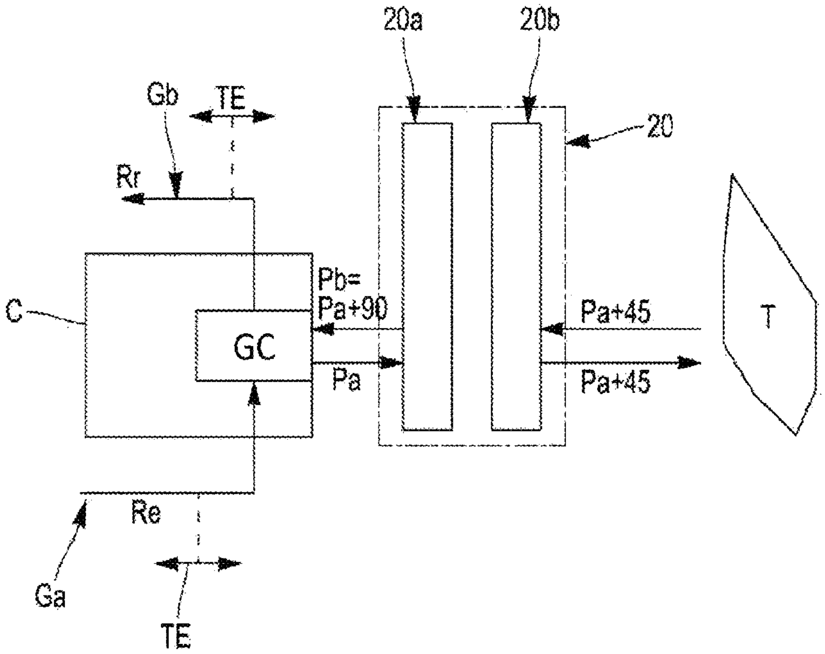
FIG. 5 depicts another exemplary embodiment of a coupling device.

FIG. 5 depicts a second example of a coupling device C, implementing this time a surface coupler GC. In the example depicted, the surface coupler GC is a coupler with a polarization-splitting grating making it possible to couple the two components Pa, Pb of the electromagnetic field of the beam reflected in free optics, into two types of radiation Re, Rr guided by two discrete waveguides Ga, Gb. The guided radiations Re, Rr have the same polarization TE. Conversely, the coupler GC makes it possible to combine two radiations Re, Rr propagated in waveguides Ga, Gb of the photonic chip 10, into a free-space emission light beam having two perpendicular components. In the case of the example of FIG. 5, only the emission radiation Re propagates toward the coupler GC on the first waveguide Ga, and the emission light beam therefore essentially has only one polarization component Pa. As for the reflected radiation, it propagates on the second waveguide Gb.

Of course, this coupling device could be used in inverted configuration as described in relation with FIG. 4, so as to obtain the same effect of changing the polarization of the emission beam.

The Faraday rotator 20*a* and the polarizer 20*b* in this second example play the same roles as those described previously.

As already noted, and when the coupling device C is an edge coupler EC or surface coupler GC, it is not necessary for the optical part 20 to include a Faraday rotator 20*a*, if the reflected beam naturally has a polarization orthogonal to the emission beam, this change of polarization possibly being caused by the reflection on the illuminated target T of the scene.

And as already noted, if the reflected beam is likely to have parasitic polarization components, especially a component orthogonal to the modified polarization Pa+45, it is possible to add to the optical part 20, downstream of the Faraday rotator 20*a* in the direction of propagation of the emission beam, a polarizer 20*b* aligned with this modified polarization Pa+45, so as to block the parasitic component at the input of the transceiver circuit 1 and thus prevent it from coupling to the laser source L. The correct stability of this source is thus preserved.

Multi-Polarization Transceiver Circuit

Figure 6A:
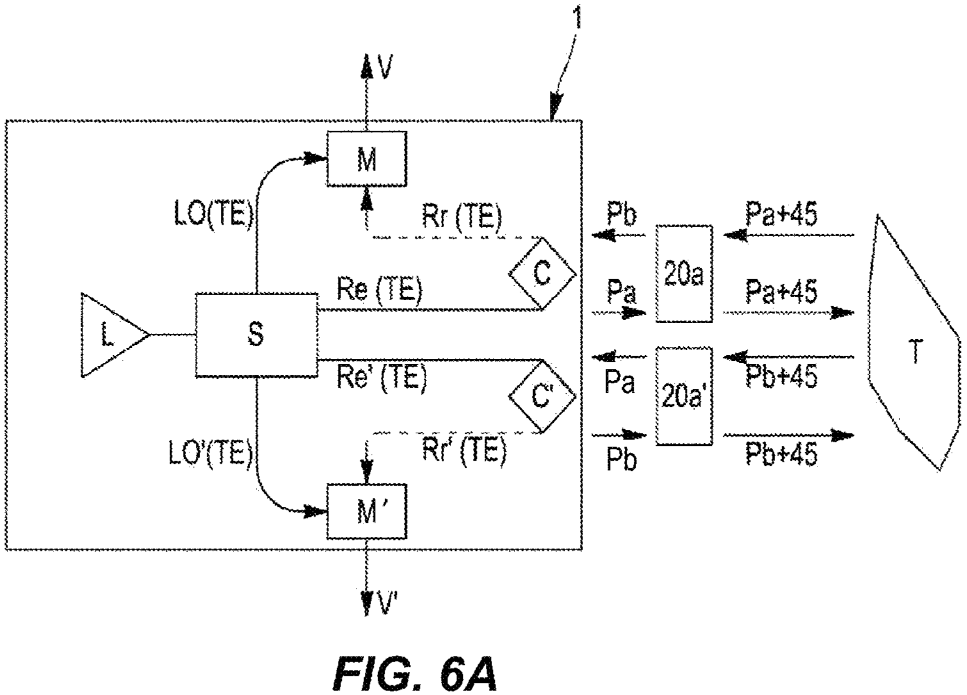
FIGS. 6A-6C depict several variants of an improved version of a transceiver circuit.

FIG. 6A presents a block diagram of an improved version of the photonic circuit 1 depicted in FIG. 3. In this version, two orthogonal polarizations are used to form a photonic circuit 1 having two discrete measurement channels that are respectively based on the two orthogonal polarizations.

The photonic circuit 1 of FIG. 6A includes the laser source L, the power splitter S, a first mixer M and a first coupling device C, optically connected to one another according to the block diagram of FIG. 6A. The first mixer M and the first coupling device C form a first measurement channel generating a first measurement signal V. The photonic circuit 1 also comprises a second mixer M' and a second coupling device C', discrete from the first coupling device C, and optically linked together to form a second measurement channel generating a second measurement signal V'.

The power splitter S has two discrete channels making it possible to guide, in the first channel, and via two discrete waveguides, the first emission radiation Re toward the first coupling device C and the first local oscillator LO toward the first mixer M. It also makes it possible to guide, in the second channel, via two other discrete waveguides, the second emission radiation Re' toward the second coupling device C' and the second local oscillator LO' toward the second mixer M'. These radiations Re, Re', LO, LO' all have the same first polarization TE.

At the output of the first coupling device C of the chip 10, and similarly to what has been disclosed in relation with the preceding figures, the propagation polarization Pa of the first emission beam is rotated through 45° by the first Faraday rotator 20*a*. The polarization of the reflected beam Pa+45 is also rotated through 45° by the first Faraday rotator 20*a* so that it has a modified propagation polarization Pb, orthogonal to the propagation polarization Pa of the emission beam, at the output of the chip 10, when it projects onto the measuring surface Sm of the chip 10. This polarization component Pb is coupled to the chip by the first coupling device C and the reflected radiation Rr, having the same first polarization TE as the first emission radiation Re, is guided toward the first mixer M.

As for the second coupling device C', it is configured to propagate a second emission beam having a propagation polarization Pb, at the output of the chip 10, orthogonal to the polarization Pa of the first emission beam. This polarization Pb is rotated through 45° by the second Faraday rotator 20*a*'. The polarization of the second reflected beam Pb+45 is rotated through 45° by the second Faraday rotator 20*a*' so that it has a modified polarization Pa, orthogonal to the propagation polarization Pb of the second emission beam, when it projects onto the measuring surface Sm of the chip 10. This polarization component Pa is coupled to the chip 10 by the second coupling device C' and the reflected radiation Rr', having the same first polarization TE as the second emission radiation Re', is guided toward the second mixer M'.

It can be seen that the transceiver circuit of FIG. 6 makes it possible to emit two emission beams having orthogonal polarizations, and defining different measurement channels for each of these polarizations.

Figure 6B:
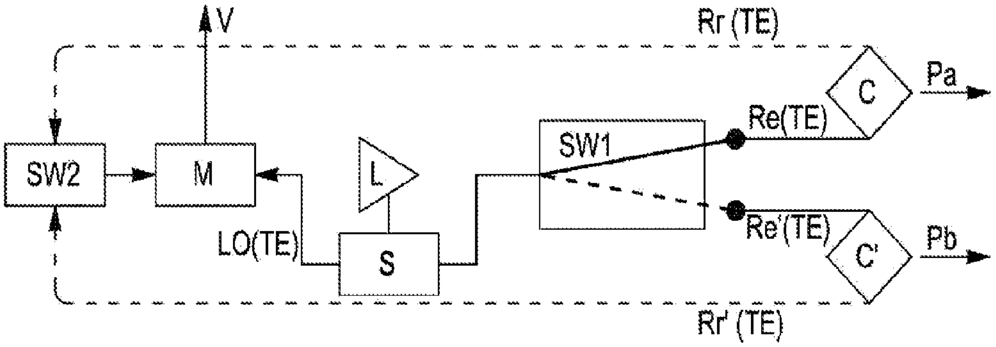

In a variant depicted in FIG. 6B, the first and second emission radiations Re, Re' are generated alternately over time (and not simultaneously) via a first switch SW1 that makes it possible to guide the light coming from the source L alternately onto the first coupling device C or the second coupling device C'. This implementation advantageously makes it possible to use only a single mixer M, connected synchronously to the first coupling device C or to the second coupling device C' via a second switch SW2 making it possible selectively to guide the first reflected radiation Rr or the second reflected radiation Rr' toward this single mixer M. The sequencing of the optical switches SW1, SW2 can be controlled by the control circuit of the chip 10.

Figure 6C:
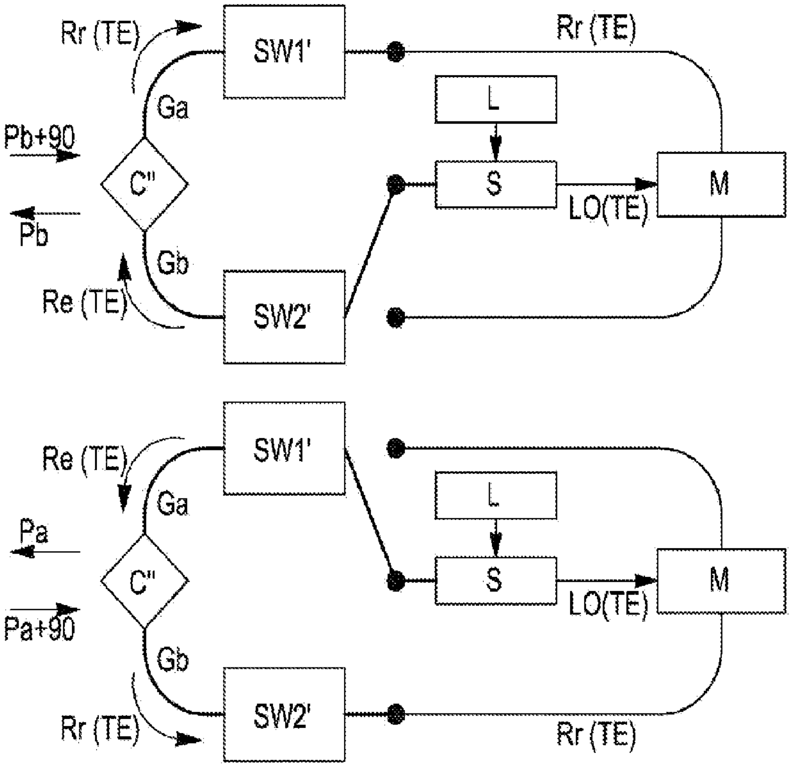

In the variant depicted in FIG. 6C, not only is the mixer M shared for each of the measurement channels, but also the coupling device. The transceiver circuit 1 indeed has two measurement channels, but uses a single time-division multiplexing coupling device C". A first switch SW1' is arranged between the laser source L (via the power splitter S), the mixer M and a first input of the coupling device C associated with a first waveguide Ga. The first switch SW1' makes it possible selectively to optically connect this first input of the coupler (the first waveguide Ga) to the splitter S or to the mixer M. A second switch SW2' is arranged between the power splitter S, the mixer M and a second input of the multiplexing coupling device C", associated with a second waveguide Gb. The second switch SW2' makes it possible selectively to optically connect the second input of the multiplexing coupling device C" (the second waveguide Gb) to the laser source L, via the splitter S, or to the mixer M.

By switching the switches SW1', SW2', it is possible to propagate, according to a first configuration making it possible to emit an emission beam having a first polarization Pa (bottom part of FIG. 6C), the emission radiation Re from the splitter S to the first input of the multiplexing coupling device C", and to propagate the reflected radiation from the second input of the multiplexing coupling device C" toward the mixer M. In this configuration, the coupler C" is configured to emit an emission beam having the first polarization Pa.

By switching the switches SW1', SW2' into a second configuration (top part of FIG. 6C), the emission radiation Re propagates from the splitter S to the second input of the multiplexing coupling device C", and the reflected radiation Rr propagates from the first input of the multiplexing coupling device C" toward the mixer M. In this second configuration, the coupling device C" is configured to emit an emission beam having a second polarization Pb, perpendicular to the first Pa.

This variant advantageously makes it possible to only have a single mixer M, and a single multiplexing coupling device C" to form the two measurement channels, which makes it possible to reduce the size of the transceiver circuit 1 and therefore of the chip 10, while providing a chip 10 offering interrogation with polarization diversity. In this example also, the sequencing of the optical switches SW1', SW2' can be controlled by the control circuit of the chip 10.

In the examples of FIGS. 6A-6C, the coupling device C, C', C" may equally incorporate an edge coupler EC according to the configuration of FIG. 4 or a surface coupler GC according to the configuration of FIG. 5. It will be understood by observing these figures that depending on whether the emission radiation Re is presented on one or the other of the inputs of the coupling device C, via the first waveguide Ga or the second waveguide Gb, the latter will emit an emission beam having a first polarization Pa or a second polarization Pb, orthogonal to the first polarization Pa.

Photonic Chip Comprising a Plurality of Transceiver Circuits

Figure 7:
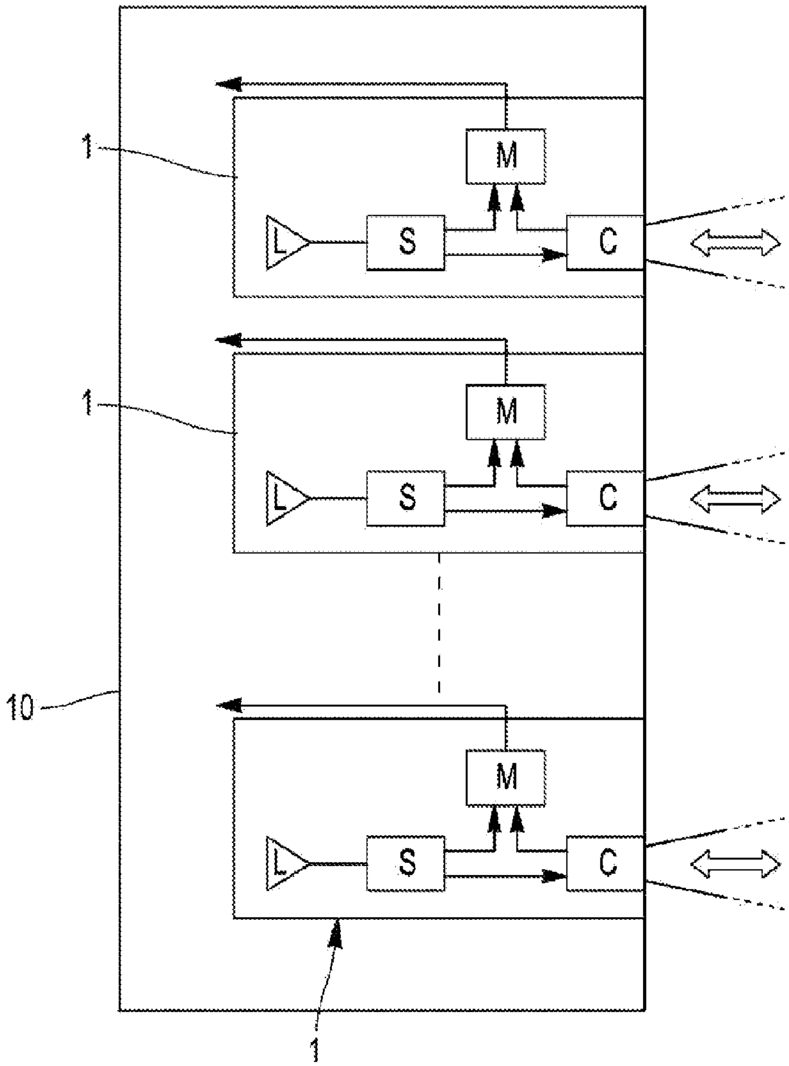
FIG. 7 depicts a block diagram of a chip comprising a plurality of transceiver circuits.

FIG. 7 shows a block diagram of a chip 10 comprising a plurality of transceiver circuits 1. For the sake of readability of FIG. 7, each of the transceiver circuits herein has a single measurement channel, but it is perfectly conceivable to integrate in the chip 10 circuits 1 having two measurement channels, which can be activated sequentially or simultaneously, in accordance with what has just been described in relation with FIGS. 6A-6C. It is possible to choose the laser sources L of each of the transceiver circuits of the chip 10 so that they all (or some of them) emit radiations having the same wavelength. However, alternatively, the laser sources L emit radiations having different wavelengths or, more precisely, having wavelengths comprised in different ranges. This avoids or limits the optical coupling that can occur between two transceiver circuits 1. The transceiver circuits 1 comprise coupling devices C configured to emit (with the assistance of the collimating lens L of the photonic component 100 that the chip 10 is intended to form) emission light beams oriented in different directions, as has already been presented in relation to the description of the photonic component 100. Since the chip 10 comprises a plurality of transceiver circuits 1, it provides a plurality of measurement signals V that can be used by a control circuit, not shown.

The chip 10 of FIG. 7 can equally be used to form a "bar-shaped" photonic component 100 of the first embodiment or to form a "surface-mounted" photonic component 100 of the second embodiment as illustrated in the bottom part of FIG. 7.

Transceiver Circuit Implementing Wavelength-Division Multiplexing

Figure 8A:
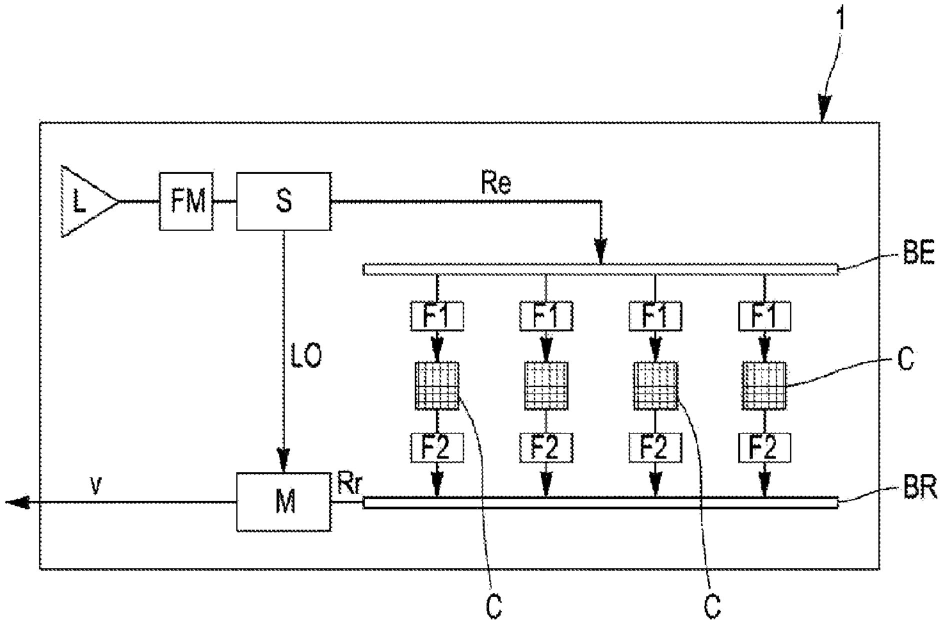
FIGS. 8A-8F depict several configurations of a transceiver circuit implementing wavelength-division or time-division multiplexing to reduce the number of components of the circuit.

FIG. 8A depicts a transceiver circuit 1 that incorporates the operating principles set out previously, but more particularly adapted to the formation of a "surface-mounted" photonic component according to which the measuring surfaces Sm are arranged to occupy a plane, for example, in the form of a matrix.

A plurality of transceiver circuits 1 in accordance with what is depicted in FIG. 8A are arranged side-by-side in a photonic chip 10, as depicted at the bottom of FIG. 7. Each transceiver circuit 1 comprises a plurality of coupling devices C, advantageously in accordance with the arrangement of FIG. 5 wherein the couplers GC are of the surface type with a polarization-splitting grating. In the transceiver circuit 1 of FIG. 8A, there is a laser source L of which the operating frequency can be modulated over a wide range of frequencies, for example, via a frequency modulation block FM. The transceiver circuit 1 also comprises the power splitter S making it possible to generate the emission radiation Re and the local oscillator LO, and the mixer M making it possible to generate a measurement signal V by interferometric pulse of the local oscillator LO and of a reflected radiation Rr.

The transceiver circuit 1 also comprises a unidirectional transmission bus BE, optically connected to the power splitter S, to distribute the emission radiation Re to the coupling devices C. The transceiver circuit 1 also comprises a reception bus BR for collecting the reflected radiation Rr provided by the coupling devices C and guiding it toward the mixer M. The coupling devices C are arranged between the unidirectional transmission bus BE and the reception bus BR, and respectively coupled to these buses via filters F1, F2 (FIG. 8A) or optical switches SW1, SW2 (FIG. 8D). These filters or optical switches are generically designated as "transmission elements."

Referring to the embodiment, referred to as "wavelength-division multiplexing," depicted in FIG. 8A, a plurality of transmission filters F1, respectively associated with the coupling devices C, have been placed between the unidirectional transmission bus BE and the coupling devices C. The transmission filters F1 make it possible to selectively couple the unidirectional transmission bus BE to a coupling device C and allow the propagation of the emission radiation Re to this device C.

Similarly, a plurality of reception filters F2, respectively associated with the coupling devices C, are arranged between the coupling devices C and the reception bus BR. The reception filters F2 make it possible to selectively couple the reception bus BR to a coupling device C in order to allow the propagation of the reflected radiation toward the mixer M.

The transmission filter F1 and reception filter F2 are bandpass filters, that is to say that they transmit radiation between a filter input and output when this radiation has a wavelength comprised in a range of transmission wavelengths specific to the filter. When the radiation has a wavelength outside this range, the radiation is blocked and is not transmitted between the input and the output of the filter.

To allow selective coupling of a coupling device C to the unidirectional transmission bus BE and reception bus BR, a transmission filter F1 and a reception filter F2 associated with a single coupling device C have identical ranges of transmission wavelengths. Conversely, the transmission filter F1 and reception filter F2 associated with different coupling devices C have different ranges of transmission wavelengths.

Preferably, the ranges of transmission wavelengths of the filters are distributed in the wide band of wavelengths of the radiation emitted by the laser source L and jointly cover, without overlapping, this wide band.

Depending on the wavelength of the emitted emission radiation Re, this radiation will propagate in one of the coupling devices C, the one whose transmission filter F1 has a range of transmission wavelengths covering the wavelength of the emission radiation Re. The reception filter F2 associated with this coupling device C having the same range of transmission wavelengths as the transmission filter F1 and the reflected radiation Rr having substantially the same wavelength as the emission radiation Re, this reflected radiation Rr will be transmitted by the reception filter F2 via the reception bus BR to the mixer M.

Thus, by selecting the wavelength of the emission radiation Re, it is possible to select the coupling device C that will be activated to emit the emission light beam from all the coupling devices C of the transceiver circuit 1.

The wavelength of the emission radiation Re may be selected in different ways. It is possible, according to a first approach, to have a master filter in the frequency modulation block FM. The master filter FM is then configured, for example, by the control device, to filter the radiation emitted by the FM block so that the emission light radiation Re has wavelengths extending in a range that matches (or is narrower than) one of the ranges of transmission wavelengths of the filters F1, F2. By configuring the master filter FM, the coupling device C that will be activated in order to propagate the emission light beam is selected in a way from all the coupling devices C of the transceiver circuit 1.

Figure 8B:
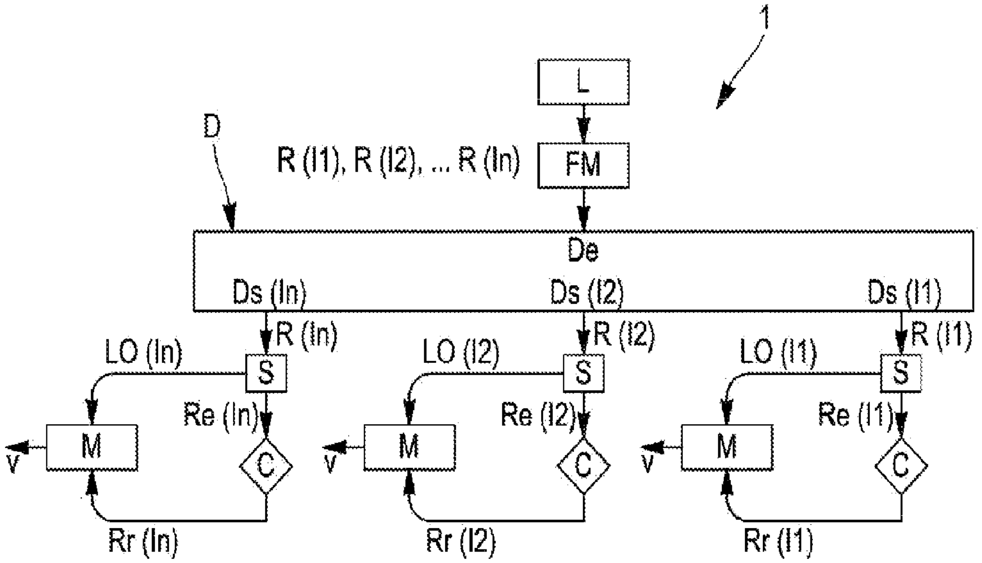

FIG. 8B depicts a first variant of a circuit 1 that also implements wavelength-division multiplexing. This first variant comprises the laser source L and the frequency modulation block FM generating a radiation R having a plurality of wavelengths R(l1), R(l2), R(*ln*). This radiation is injected into an input De of a wavelength-division demultiplexer D, having a plurality of outputs Ds(l1), Ds(l2), Ds(*ln*) to respectively provide radiations R(l1), R(l2), R(*ln*) each having a particular wavelength l1, l2, *ln*.

Each output Ds of the demultiplexer D is optically linked to a power splitter S, providing a local oscillator LO(l1), LO(l2), LO(*ln*) and an emission radiation Re(l1), Re(l2), Re(*ln*). The wavelength of a local oscillator LO and an emission radiation Re coming from the same splitter S are, of course, identical. Each emission radiation Re is guided toward a first input of a coupling device C, and the reflected radiation Rr coming from this device C is guided toward a mixer M dedicated to this coupling device C. The mixer M also receives the local oscillator from the power splitter S, in order to provide a measurement signal V.

In this example, therefore, the demultiplexer D respectively distributes the wavelength components of a radiation R having a plurality of wavelengths toward the coupling devices C.

Figure 8C:
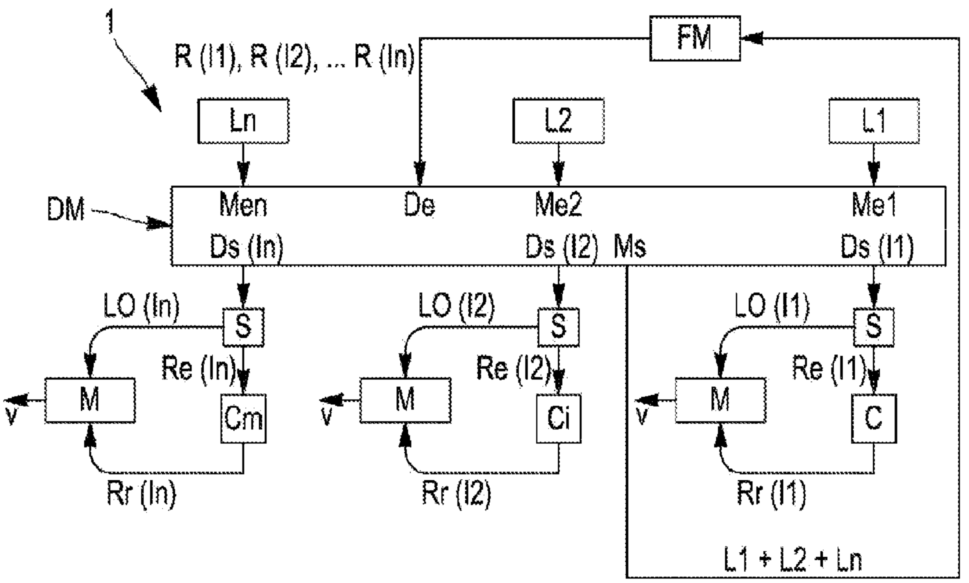
Figure 8D:
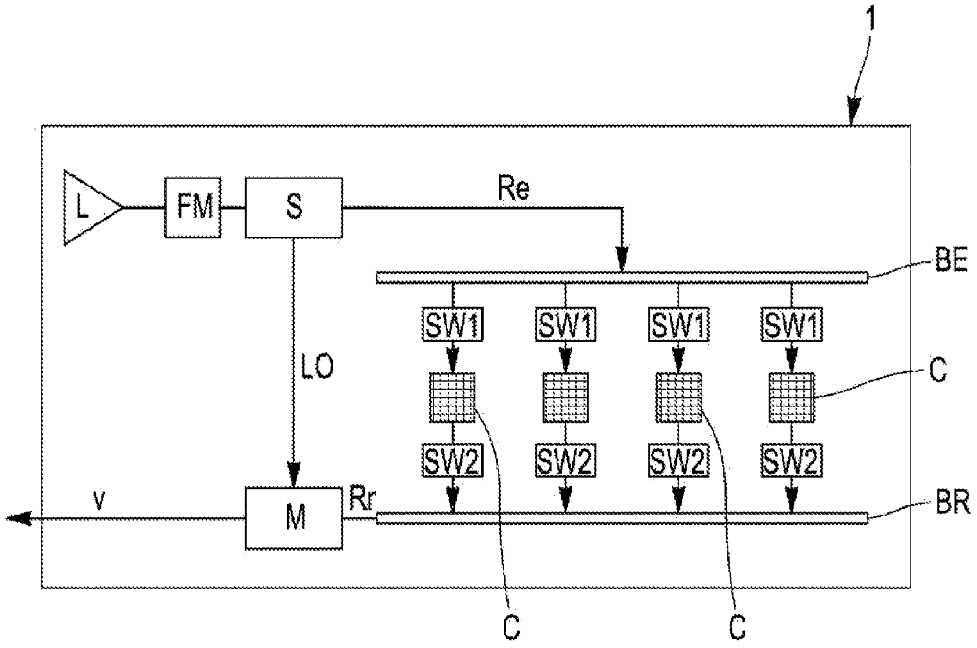

FIG. 8C depicts another variant of a transceiver circuit 1 also implementing wavelength-division multiplexing. This second variant comprises the power splitters S, the coupling devices C and the mixers M making it possible to process in combination a radiation having a particular wavelength l1, l2, lm coming from an output Ds(l1), Ds(l2), Ds(*ln*) of a wavelength-division demultiplexer.

This demultiplexer is, in this variant, a multiplexer-demultiplexer DM that has a plurality of multiplexing inputs Me1, Me2, Men each connected to a laser source L1, L2, *Ln* continuously emitting a radiation having a particular wavelength l1, l2, *ln*. It has a multiplexing output Ms from which a continuous wave radiation is derived combining those presented on the multiplexing inputs Me1, Me2, Men. This radiation is guided toward the modulation block FM, which itself guides the generated radiation R(l1), R(l2), R(*ln*) to the demultiplexing input De of the multiplexer-demultiplexer DM.

In this example, the transceiver circuit 1 comprises a plurality of laser sources L1, L2, *Ln* emitting according to a plurality of different wavelengths l1, l2, *ln*. The transceiver circuit 1 also comprises a multiplexer, herein combined with the radiation distribution demultiplexer R, to produce the radiation R having the plurality of wavelengths.

Transceiver Circuit Implementing Time-Division Multiplexing

FIG. 8D depicts a so-called "time-division multiplexing" embodiment of the transceiver circuit 1 having an architecture similar to that of the example of FIG. 8A. The filters F1, F2 connecting the coupling devices C to the buses BE, BR of the example of FIG. 8A are herein replaced by switches SW1, SW2. The switches SW1, SW2 associated with a coupling device C can be ordered closed for a predetermined period of time (for example, by the control device of the chip 10), so as to selectively couple this coupling device C to the buses BE, BR during this period of time. And during this period of time, the switches SW1, SW2 associated with the other coupling devices C can be ordered open in order to decouple these other coupling devices from the buses BE, BR. By appropriately controlling in time the switches SW1, SW2 of the transceiver circuit 1, it is possible to successively activate the coupling devices C to emit an emission beam, receive the reflected beam, and generate a measurement signal V by means of the mixer M. For this purpose, the switch SW2 connecting the coupling device C to the reception bus BR may be kept closed for a duration sufficient to allow the propagation of the emission and reflected beams up to the target and the reception of the reflected beam on the measuring surface of the chip 10.

Figure 8E:
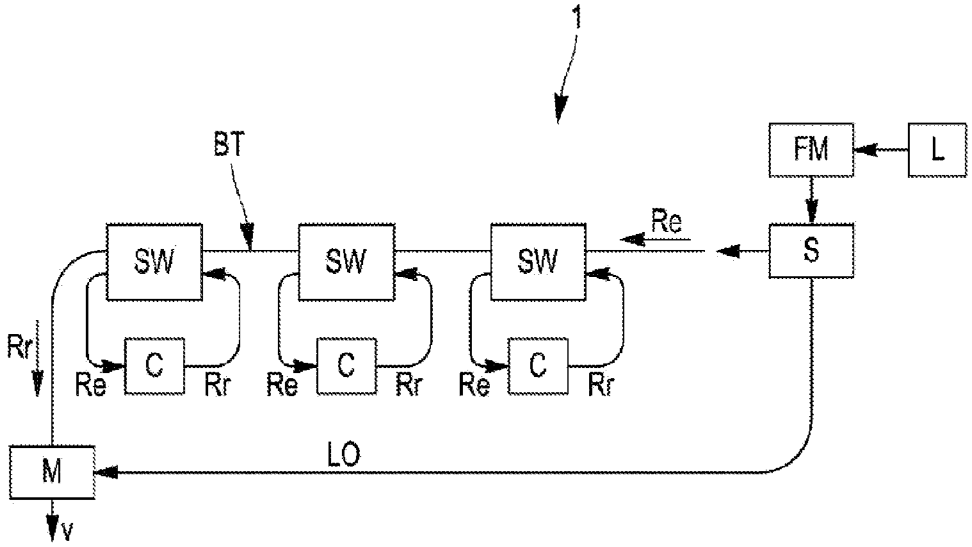

FIG. 8E depicts a very advantageous variant of the time-division multiplexing embodiment depicted in FIG. 8D. In this variant, a single bidirectional transmission bus BT distributes the emission radiation Re from the power splitter S to a plurality of coupling devices C. The same bidirectional transmission bus BT collects the reflected radiation Rr from the plurality of these coupling devices. An optical circulator switch SW makes it possible to selectively associate each coupling device of the circuit 1 with the bidirectional transmission bus BT. As in the preceding example, only one of the switches SW is closed over time on a coupling device, effectively making it possible to time-division multiplex the use of the coupling devices. In addition, the optical circulator switch SW of this example makes it possible both to guide the emission radiation Re from the bidirectional transmission bus to an input of the coupling device, and to guide the reflected radiation Rr from the other input of the coupling device to the bidirectional transmission bus BT so that it continues its propagation.

The end of the bidirectional transmission bus, opposite that wherein the emission radiation Re is injected by the frequency modulation block FM, is optically connected to the mixer M, in order to generate the measurement signal V, as in the preceding examples of the transceiver circuit 1.

Figure 8F:
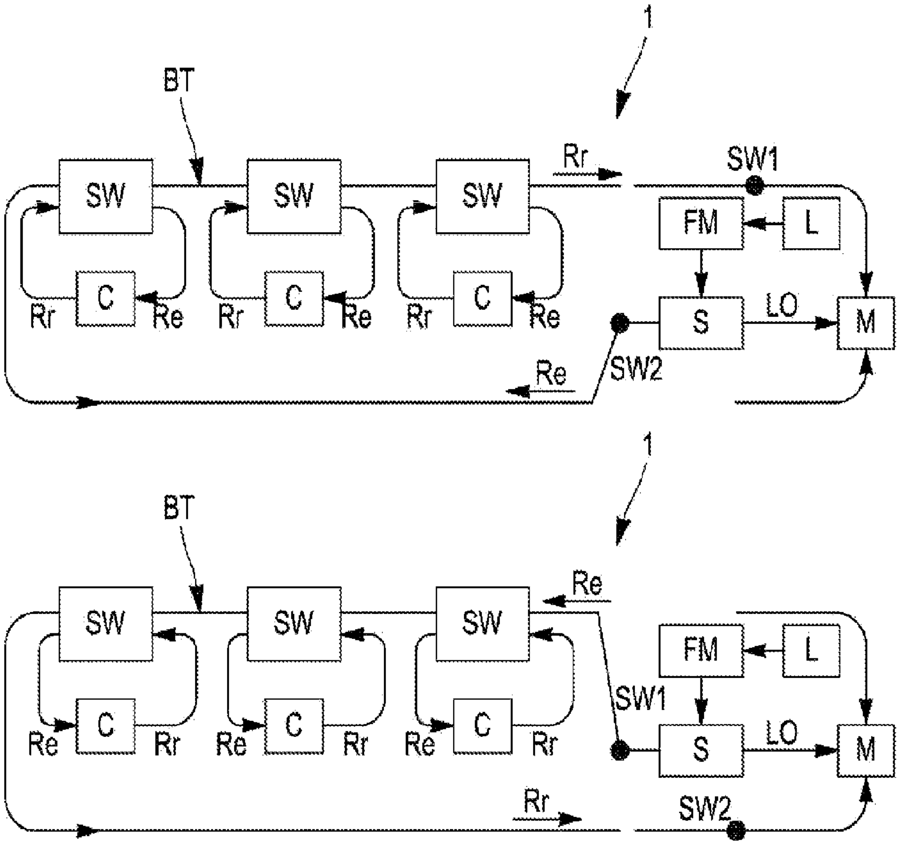

FIG. 8F combines the architecture of the time-division multiplexing transceiver circuit of FIG. 8D with that of FIG. 6C, sharing certain components of the circuit to offer the transceiver circuit 1 two measurement channels according to different polarizations. This FIG. 8F shows the bidirectional transmission bus BT, the laser source L, the frequency modulation block FM, the power splitter S, and the modules formed of a coupling device C and an optical circulator switch SW, in a configuration identical to that of FIG. 8D. Switches SW1, SW2 have also been provided that make it possible to propagate, according to their configuration, the emission radiation (and the reception radiation) in opposite directions of propagation.

By switching the switches SW1, SW2, it is thus possible to propagate, according to a first configuration making it possible to emit an emission beam having a first polarization Pa (top part of FIG. 8F), the emission radiation Re of the splitter at a first input of a coupling device C selected by one of the optical circulator switches SW. And the reflected radiation Rr coming from a second input of the coupling device C can be propagated toward the mixer M. In this configuration, the selected coupler C is configured to emit an emission beam having the first polarization Pa.

By switching the switches SW1, SW2 in a second configuration (bottom part of FIG. 8F), the emission radiation Re propagates from the splitter S to the second input of the coupling device C selected by one of the optical circulator switches SW. The reflected radiation Rr propagates from the first input of the coupling device C toward the mixer M. In this second configuration, the coupling device C is configured to emit an emission beam having a second polarization Pb, perpendicular to the first polarization Pa.

In other words, the two switches SW1, SW2 make it possible to selectively propagate the emission radiation Re in the bidirectional transmission bus BT in a first propagation direction or a second propagation direction, opposite to the first. According to the direction of propagation of this radiation, the coupling devices C, associated with the bidirectional transmission bus by the optical circulator switches SW, emit an emission beam having a first polarization Pa or a second polarization Pb, perpendicular to the first Pa.

Of course, the present disclosure is not limited to the embodiments described and variant embodiments can be added thereto without departing from the scope of the invention as defined by the claims.

The invention claimed is:

1. A photonic component, comprising:

at least one photonic chip; and at least one optical part;

wherein the photonic chip includes at least one transceiver circuit comprising at least one laser source for providing a first radiation, referred to as local oscillator, to an optical mixer and for providing emission radiation to a coupling device, the local oscillator and the emission radiation having a predetermined polarization, the coupling device being configured to propagate in free space, from a measuring surface, the emission radiation in the form of an emission light beam, to receive, in return, on the same measuring surface a reflected light beam and to guide it toward the optical mixer as reflected radiation having the predetermined polarization, the optical mixer generating a measurement signal by interferometric pulse of the local oscillator and the reflected radiation; and wherein the optical part has a Faraday rotator arranged at the measuring surface of the photonic chip in order to intercept the emission light beam and the reflected light beam, the optical part also having a polarizer, arranged downstream of the Faraday rotator in the direction of propagation of the emission light beam, the polarizer configured to allow the transmission of the emission light beam and of the reflected light beam according to a single polarization, the single polarization matching the polarization imposed on the emission light beam by the Faraday rotator.

2. The photonic component of claim 1, wherein the laser source comprises, or is associated with, a frequency modulator.

3. The photonic component of claim 1, wherein the photonic chip comprises a power splitter optically associated with the laser source, the power splitter providing the local oscillator and the emission radiation.

4. The photonic component of claim 1, wherein the coupling device of the transceiver circuit comprises a first waveguide and a second waveguide and, arranged between the first and the second waveguide, an edge coupler optically connected to a polarization beam splitter and to a polarization rotator.

5. The photonic component of claim 1, wherein the coupling device of the transceiver circuit comprises a first waveguide and a second waveguide and, arranged between the first and the second waveguide, a surface coupler with a polarization-splitting grating.

6. The photonic component of claim 1, wherein the transceiver circuit comprises a first measurement channel for propagating a first emission beam having, at the chip output, a first propagation polarization and a second measurement channel for propagating a second emission beam having a second propagation polarization orthogonal to the first propagation polarization.

7. The photonic component of claim 6, wherein the first emission beam is propagated by a first coupling device and the second emission beam is propagated by a second coupling device, discrete from the first.

8. The photonic component of claim 7, wherein the transceiver circuit comprises a first switch optically arranged between the laser source and the first and second coupling devices and a second switch that is optically arranged between the first and second coupling devices and the optical mixer.

9. The photonic component of claim 6, wherein the transceiver circuit comprises:

a first switch for selectively connecting a first waveguide of a multiplexing coupling device to the laser source or to the optical mixer; and a second switch for selectively connecting a second waveguide of the multiplexing coupling device to the laser source or to the optical mixer.

10. The photonic component of claim 1, wherein the photonic chip comprises a plurality of transceiver circuits.

11. The photonic component of claim 1, wherein the transceiver circuit comprises a plurality of coupling devices.

12. The photonic component of claim 11, wherein the at least one laser source emits a radiation having a plurality of wavelengths, and wherein the transceiver circuit comprises a wavelength-division demultiplexer for respectively distributing the wavelengths of the radiation toward the coupling devices optically connected to outputs of the wavelength-division demultiplexer.

13. The photonic component of claim 12, wherein the transceiver circuit comprises a plurality of laser sources respectively emitting the plurality of wavelengths, the transceiver circuit also comprising a wavelength-division multiplexer for producing the radiation having the plurality of wavelengths.

14. The photonic component of claim 12, wherein the outputs of the wavelength-division demultiplexer are respectively coupled to power splitters providing, respectively, local oscillators to optical mixers and emission radiations to the coupling devices.

15. The photonic component of claim 11, wherein the transceiver circuit comprises:

a unidirectional transmission bus optically connected to the laser source and a reception bus optically connected to the mixer, the plurality of coupling devices being arranged optically between the unidirectional transmission bus and the reception bus;

a first plurality of transmission elements, arranged between the unidirectional transmission bus and the plurality of coupling devices, in order to selectively couple the unidirectional transmission bus to a predetermined coupling device and allow the propagation of the emission radiation; and a second plurality of transmission elements, arranged between the plurality of coupling devices and the reception bus, for selectively coupling the predetermined coupling device to the reception bus and allowing the propagation of the reflected radiation.

16. The photonic component of claim 15, wherein the transmission elements are filters, the filters respectively associated with a coupling device having ranges of transmission wavelengths that are identical to one another.

17. The photonic component of claim 15, wherein the transmission elements are switches.

18. The photonic component of claim 11, wherein the transceiver circuit comprises a bidirectional transmission bus optically arranged between a power splitter and the mixer, the bidirectional transmission bus being selectively coupled to the coupling devices by optical circulator switches.

19. The photonic component of claim 18, wherein the photonic chip further comprises two switches for selectively propagating the emission radiation in the bidirectional transmission bus in a first propagation direction or in a second propagation direction, opposite to the first propagation direction.

20. The photonic component of claim 1, further comprising a lens for collimating the emission light beam and the reflected light beam.

* * * * *